(12) United States Patent
Umeda

(10) Patent No.: US 11,574,147 B2
(45) Date of Patent: Feb. 7, 2023

(54) MACHINE LEARNING METHOD, MACHINE LEARNING APPARATUS, AND COMPUTER-READABLE RECORDING MEDIUM

(71) Applicant: FUJITSU LIMITED, Kawasaki (JP)

(72) Inventor: Yuhei Umeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 972 days.

(21) Appl. No.: 16/285,222

(22) Filed: Feb. 26, 2019

(65) Prior Publication Data
US 2019/0279039 A1    Sep. 12, 2019

(30) Foreign Application Priority Data
Mar. 9, 2018    (JP) .............................. JP2018-043328

(51) Int. Cl.
*G06V 10/00*    (2022.01)
*G06K 9/62*    (2022.01)
*G06N 3/08*    (2006.01)

(52) U.S. Cl.
CPC ........... *G06K 9/6259* (2013.01); *G06K 9/623* (2013.01); *G06K 9/6257* (2013.01); *G06N 3/084* (2013.01)

(58) Field of Classification Search
CPC .... G06V 10/70; G06V 10/774; G06V 30/191; G06V 30/19147; G06K 9/6259; G06K 9/6257; G06K 9/623; G06N 7/023; G06N 7/046; G06N 20/00; G06N 3/02; G06N 3/08; G06N 3/082; G06N 3/084; G06N 3/086; G06N 3/088; G06T 9/002; G06T 2207/20081; G06T 2207/2084; G06T 3/4046

See application file for complete search history.

(56) References Cited

U.S. PATENT DOCUMENTS

| | | | | |
|---|---|---|---|---|
| 7,860,813 B2* | 12/2010 | Wang | ..................... | G09B 9/052 |
| | | | | 706/12 |
| 8,112,421 B2* | 2/2012 | Sun | ........................ | G06F 16/334 |
| | | | | 707/748 |
| 10,262,272 B2* | 4/2019 | Chickering | ............ | G06N 20/00 |
| 10,535,017 B2* | 1/2020 | Johnson | ................. | G06N 7/005 |
| 10,699,215 B2* | 6/2020 | Devarakonda | ......... | G06N 5/022 |
| 10,726,313 B2* | 7/2020 | Lee | ........................ | G06V 10/82 |

(Continued)

FOREIGN PATENT DOCUMENTS

| | | |
|---|---|---|
| JP | 2009-543254 A | 12/2009 |
| JP | 2014-049100 A | 3/2014 |
| WO | 2008/008142 A2 | 1/2008 |

*Primary Examiner* — Amir Alavi

(74) *Attorney, Agent, or Firm* — Xsensus LLP

(57) ABSTRACT

A non-transitory computer-readable recording medium stores therein a learning program that causes a computer to execute a process including: setting each of scores to each of a plurality of sets of unlabeled data with regard to each of labels used in a plurality of sets of labeled data based on a distance of each of the plurality of sets of unlabeled data with respect to each of the labels; and causing a learning model to learn using a neural network by using the plurality of sets of labeled data respectively corresponding to the labels of the plurality of sets of labeled data, and the plurality of sets of unlabeled data respectively corresponding to the scores of the plurality of sets of unlabeled data with regard to the labels.

12 Claims, 9 Drawing Sheets

(56) References Cited

U.S. PATENT DOCUMENTS

| | | | | |
|---|---|---|---|---|
| 10,839,394 B2* | 11/2020 | Jia | ............................ | G06N 20/00 |
| 10,861,064 B2* | 12/2020 | Cleverley | ................ | G06F 40/30 |
| 10,885,388 B1* | 1/2021 | Kim | ..................... | G06K 9/6262 |
| 11,113,574 B1* | 9/2021 | Ryu | ..................... | G06K 9/6267 |
| 2019/0228320 A1* | 7/2019 | Feng | ........................ | G06N 5/025 |
| 2019/0279039 A1* | 9/2019 | Umeda | .................. | G06K 9/623 |

* cited by examiner

FIG.2
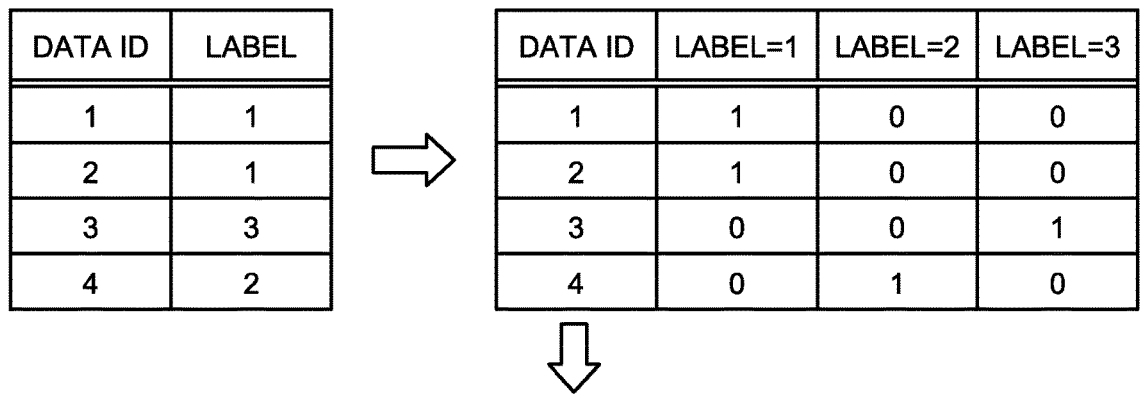
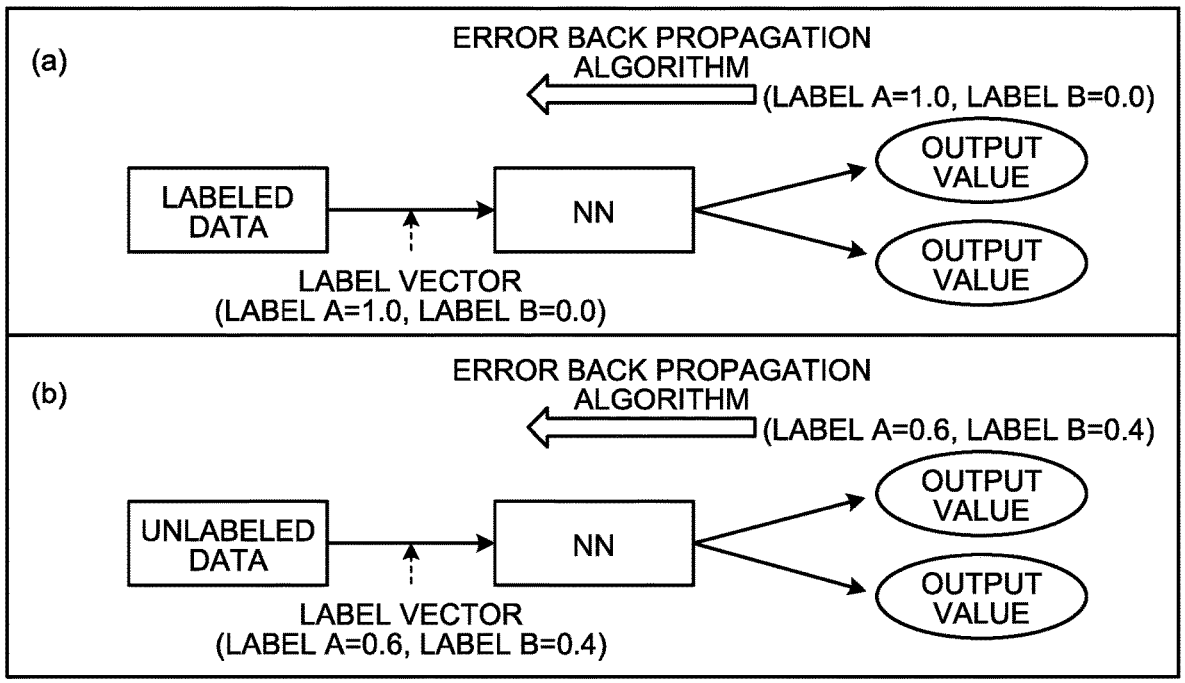

| DATA ID | LABEL 1 | LABEL 2 | LABEL 3 |
|---|---|---|---|
| 1 | 1.0 | 0 | 0 |
| 2 | 0.6 | 0.4 | 0 |
| ... | ... | ... | ... |

| ONLY LABELED | LABELED+UNLABELED (PSEUDO-LABEL) | WHOLE DATA (INCLUDING UNLABELED GIVEN WITH ACCURATE LABEL) |
|---|---|---|
| 55% | 74% | 78% |

MACHINE LEARNING METHOD, MACHINE LEARNING APPARATUS, AND COMPUTER-READABLE RECORDING MEDIUM

CROSS-REFERENCE TO RELATED APPLICATION

This application is based upon and claims the benefit of priority of the prior Japanese Patent Application No. 2018-043328, filed on Mar. 9, 2018, the entire contents of which are incorporated herein by reference.

FIELD

The embodiment(s) discussed herein is (are) related to a learning method, a learning apparatus, and computer-readable recording medium.

BACKGROUND

There are known technologies regarding deep learning (DL) using data with a label. For deep learning, and the like, a large number of sets of labeled data, which has a label attached thereto, are used; however, generally, a number of sets of labeled data is small and there are often a large number of sets of unlabeled data that has no label attached thereto. For example, when time-series data is used as learning data, logs are monitored, and a label is applied when a predetermined event occurs; however, acquisition of a sufficient amount of data is time-consuming, and it is sometimes difficult to cause a predetermined event.

In recent years, semi-supervised learning has been known, which executes learning by using labeled data and unlabeled data, and during semi-supervised learning, labeled data is used to apply a label to unlabeled data.

For example, the technique (technique 1) is known, which uses a classifier that conducts clustering with labeled data and unlabeled data included and applies a label to unlabeled data such that data in the same cluster has the same label. Furthermore, the technique (technique 2) is known, which calculates the degree of similarity between labeled data and unlabeled data in each cluster obtained by the technique 1, or the like, and applies the label of labeled data having the highest degree of similarity to each set of unlabeled data. Moreover, the technique (technique 3) is known, in which when there is an amount of data enough to determine the entire distribution and the distribution of one label for binary classification, the distribution of the other data is calculated so as to obtain the entire distribution by adding it to the known distribution, and unlabeled data is classified in accordance with the distribution obtained by calculation.

Patent Document 1: Japanese National Publication of International Patent Application No. 2009-543254

Patent Document 2: Japanese Laid-open Patent Publication No. 2014-049100

According to the above-described technology, however, when labels do not have a high separation property or there is not an amount of data enough to determine data distribution, assignment of a label to unlabeled data is not always accurate, and the accuracy of determination using learning results is reduced.

For example, with the technique 1, a low separation property of the target data or unknown data structure, or the like, for clustering makes classification into multiple clusters difficult and reduces the accuracy of applied labels. FIG. 10 is a diagram that illustrates clustering according to the technique 1. In the example of FIG. 10, the boundary for classifying clusters is different from the boundary for classifying only labeled data. In this case, the vague boundary between a positive example and a negative example and an inaccurate label applied to unlabeled data based on a classified cluster reduces the learning accuracy.

With the technique 2, the accuracy near the boundary of clusters is not high so that labeled data with the highest degree of similarity to unlabeled data belonging to a cluster 2 is present not in the cluster 2 but in a cluster 1 even though there is a certain separation property. Furthermore, no separation property between data sets causes high non-linearity near the boundary between clusters, and it halts progress in learning. FIG. 11 is a diagram that illustrates label setting according to the technique 2. In the example of FIG. 11, labeled data D1 belonging to the cluster 2 is attached with the label of labeled data B belonging to the same cluster 2 although it is closer to labeled data A in the cluster 1. That is, the priority given to the constraint, that is, use of data in a cluster, decreases the accuracy of label setting and reduces the learning accuracy.

The technique 3 is not applicable when there is not an amount of data enough to determine the distribution of the entire data and the distribution of data with a certain type of label. Thus, the above-described technique assumes a hypothetical separation property, that is, separation of distributions of occurring data for each label, and a sufficient amount of data, and when the assumptions are not satisfied, it is difficult to assure performance.

SUMMARY

According to an aspect of an embodiment, a non-transitory computer-readable recording medium stores therein a learning program that causes a computer to execute a process including: setting each of scores to each of a plurality of sets of unlabeled data with regard to each of labels used in a plurality of sets of labeled data based on a distance of each of the plurality of sets of unlabeled data with respect to each of the labels; and causing a learning model to learn using a neural network by using the plurality of sets of labeled data respectively corresponding to the labels of the plurality of sets of labeled data, and the plurality of sets of unlabeled data respectively corresponding to the scores of the plurality of sets of unlabeled data with regard to the labels.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram that illustrates an example of label setting according to the first embodiment;

DESCRIPTION OF EMBODIMENT(S)

Preferred embodiments will be explained with reference to accompanying drawings. Furthermore, the present invention is not limited to the embodiments. Moreover, the embodiments may be combined as needed as long as the consistency is ensured.

[a] First Embodiment

Overall Configuration

Figure 1:
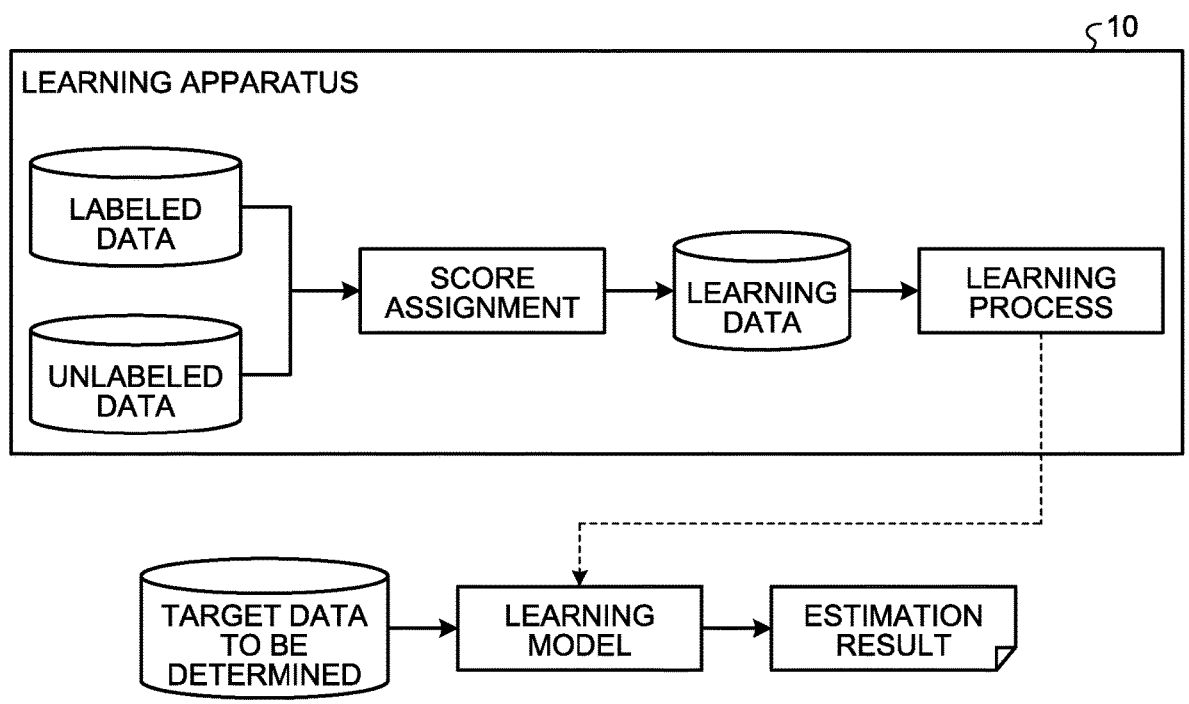
FIG. 1 is a diagram that illustrates an example of the overall learning apparatus according to a first embodiment.

FIG. 1 is a diagram that illustrates an example of the overall learning apparatus according to a first embodiment. As illustrated in FIG. 1, a learning apparatus 10 according to the first embodiment applies a score with regard to the label of learning data and then executes a determination process (learning process) using machine learning, deep learning (DL), or the like, and to properly determine (classify) learning data for each event, causes a neural network (NN), or the like, to learn by using the score. Then, by using the learning model to which a learning result is applied, a proper event (label) in the target data to be determined is estimated. Furthermore, as the learning data, various types of data such as images, moving images, documents, or graphs may be used.

Specifically, the learning apparatus 10 causes the learning model to learn by using a plurality of sets of labeled data and a plurality of sets of unlabeled data. Here, the learning apparatus 10 sets a score in each set of unlabeled data with regard to each of the labels used for the sets of labeled data based on the distance of each set of unlabeled data with regard to each of the labels. Furthermore, the learning apparatus 10 causes the learning model using the neural network to learn by using the sets of labeled data, the respective labels of the sets of labeled data, the sets of unlabeled data, and the scores of the respective sets of unlabeled data with regard to the labels.

FIG. 2 is a diagram that illustrates an example of label setting according to the first embodiment. Typical machine learning determines a label for each set of data and inputs it. For DL, the correlation (e.g., score) between each set of data and each label is used as the objective function. For example, a label is set by giving each set of data with a vector such that the element of the label of the data is 1 and the other elements are 0.

Specifically, for labeled data, the label vector "label 1, label 2, label 3" is set as a label and training is conducted. As illustrated in FIG. 2, the label vector "1, 0, 0" is set for labeled data 1 with the label 1, the label vector "0, 0, 1" is set for labeled data 3 with the label 3, and the label vector "0, 1, 0" is set for labeled data 4 with the label 2.

With regard to unlabeled data, however, it is considered that addition of a wrong label causes inaccuracy of the label and therefore adverse effect on learning. As labeling of learning data for DL is not needed and the ratio of probability would be sufficient, the learning apparatus 10 obtains learning data by applying, to unlabeled data, the ratio of temporary labels that are based on the ratio of labels of neighboring labeled data sets.

Specifically, as illustrated in FIG. 2(*a*), the learning apparatus 10 sets the label vector "label A (1.0), label B (0.0)" for labeled data to which the label A has been applied, inputs it to the NN, and uses the error back propagation algorithm to train the NN so as to determine the label A. Conversely, as illustrated in FIG. 2(*b*), the learning apparatus 10 sets the label vector "label A (0.6), label B (0.4)" for unlabeled data, inputs it to the NN, and uses the error back propagation algorithm to train the NN such that the ratio of each label is the determined ratio.

In this way, for semi-supervised learning, the learning apparatus 10 eliminates, with a small number of labels, the adverse effect of label addition using clustering with regard to unlabeled data (unsupervised data).

Functional Configuration

Figures 3, 4:
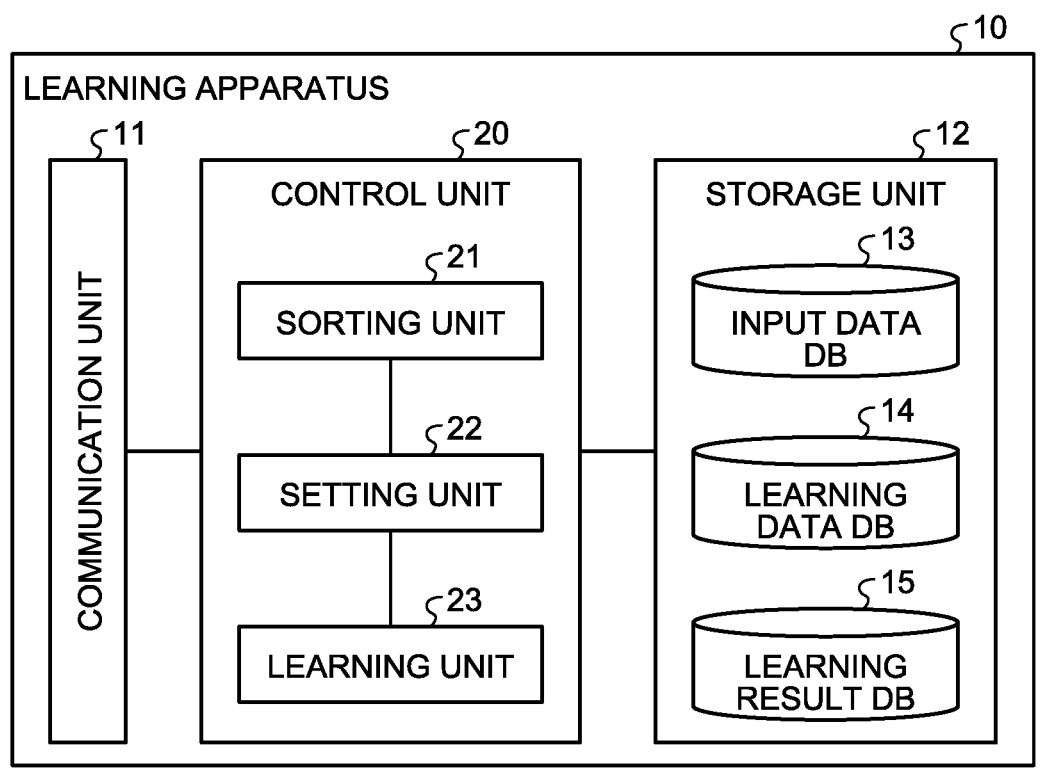
FIG. 3 is a functional block diagram that illustrates a functional configuration of the learning apparatus according to the first embodiment.
FIG. 4 is a diagram that illustrates an example of information stored in a learning data DB.

FIG. 3 is a functional block diagram that illustrates a functional configuration of the learning apparatus according to the first embodiment. As illustrated in FIG. 3, the learning apparatus 10 includes a communication unit 11, a storage unit 12, and a control unit 20.

The communication unit 11 is a processing unit that controls communications with other devices, and it is for example a communication interface. For example, the communication unit 11 receives a processing start command from the administrator's terminal. Furthermore, the communication unit 11 receives the target data (input data) to be trained from the administrator's terminal, or the like, and stores it in an input data DB 13.

The storage unit 12 is an example of a storage device that stores programs or data, and it is for example a memory or a hard disk. The storage unit 12 stores the input data DB 13, a learning data DB 14, and a learning result DB 15.

The input data DB 13 is a database that stores the target input data to be trained. For example, the input data DB 13 stores labeled data, i.e., labeled learning data, to which a label is set (attached) manually, or the like, and unlabeled data, i.e., unlabeled learning data, to which no label is set manually, or the like. Furthermore, data may be stored by the administrator, or the like, or may be stored after being received by the communication unit 11.

The learning data DB 14 is a database that stores the target labeled data for learning. Specifically, by the control unit 20 described later, the learning data DB 14 stores labeled data (supervised data) with a set label vector with regard to labeled data with a label originally attached thereto and unlabeled data with no label attached thereto.

FIG. 4 is a diagram that illustrates an example of information stored in the learning data DB 14. As illustrated in FIG. 4, the learning data DB 14 stores "data ID, label 1, label 2, label 3" in a related manner. The example of FIG. 4 indicates that the data with data ID "1" has the label vector "1.0, 0, 0" set as "label 1, label 2, label 3" and the data with data ID "2" has the label vector "0.6, 0.4, 0" set as "label 1, label 2, label 3". Furthermore, the number of dimensions and the numerical value of label vectors described here are examples, and they may be optionally changed and set.

The learning result DB 15 is a database that stores learning results. For example, the learning result DB 15 stores determination results (classification results) of learning data by the control unit 20 and various types of parameters that are learned during machine learning or deep learning.

The control unit 20 is a processing unit that controls a process of the overall learning apparatus 10, and it is for example a processor. The control unit 20 includes a sorting unit 21, a setting unit 22, and a learning unit 23. Furthermore, the sorting unit 21, the setting unit 22, and the learning unit 23 are examples of a process executed by a processor, an electronic circuit included in the processor, or the like.

The sorting unit 21 is a processing unit that sorts each set of data stored in the input data DB 13, whether labeled data with a label originally attached thereto or unlabeled data with no label attached thereto. Specifically, the sorting unit 21 reads input data from the input data DB 13 and determines whether any label is attached thereto. Then, the sorting unit 21 notifies the setting unit 22 of labeled data and unlabeled data, which have been sorted, and store them in the storage unit 12.

The setting unit 22 is a processing unit that sets a label vector in input data sorted by the sorting unit 21. Specifically, the setting unit 22 generates a label vector having "1" set in only a corresponding element with regard to labeled data and generates a label vector based on the distance from labeled data with regard to unlabeled data. Then, the setting unit 22 generates learning data having a label vector added to the input data and stores it in the learning data DB 14.

For example, the setting unit 22 generates "1.0, 0, 0" as the label vector "label 1, label 2, label 3" for the labeled data D1 for which the label 1 is set. Then, in the learning data DB 14, the setting unit 22 stores, as learning data, the labeled data D1 "data+label vector (1.0, 0, 0)" by replacing the label 1 in the labeled data D1 "data+label 1" with the label vector.

Furthermore, for unlabeled data D2, the setting unit 22 probabilistically estimates a label by calculating the ratio of data sets in a close distance based on the assumption that data sets in a close distance have a similar feature (the same label). Specifically, with regard to the unlabeled data D2, the setting unit 22 calculates close labels among the labels initially set in labeled data sets based on distances. Then, the setting unit 22 calculates a score using, for example, the ratio of labels in a close distance and sets it in the unlabeled data, thereby generating learning data having a pseudo-label attached thereto.

Figure 5:
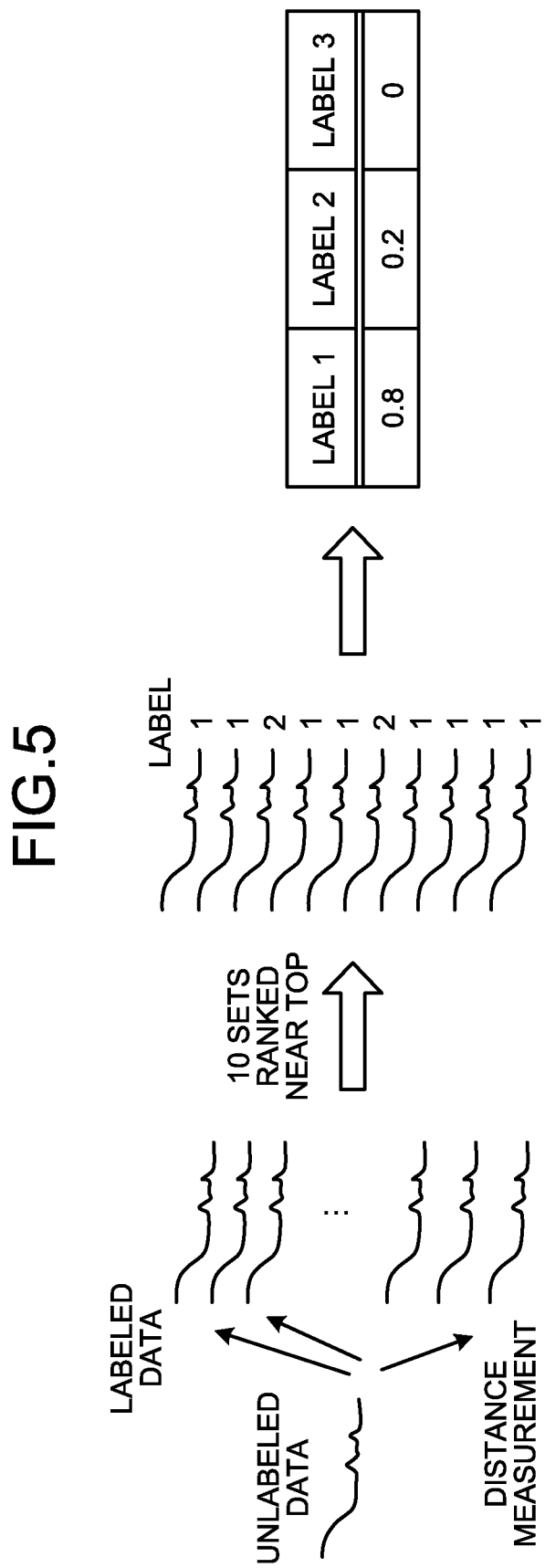
FIG. 5 is a diagram that illustrates an example of setting of a label vector based on the distance between data sets.

FIG. 5 is a diagram that illustrates an example of setting of a label vector based on the distance between data sets. As illustrated in FIG. 5, the setting unit 22 calculates the distance between unlabeled data and each set of labeled data (data with a label) by using the degree of similarity or the degree of association. Then, the setting unit 22 extracts 10 sets of labeled data that are in a close distance from the unlabeled data. Afterward, the setting unit 22 refers to the labels of the extracted sets of labeled data and counts them such that the number of the label 1 is 8, the number of the label 2 is 2, and the number of the label 3 is 0.

Then, the setting unit 22 calculates "(8/10=0.8), (2/10=0.2), 0/10=0" as the label vector "label 1, label 2, label 3". As a result, with regard to the unlabeled data D2, the setting unit 22 stores, in the learning data DB 14, the labeled data D2 "data+label vector (0.8, 0.2, 0)" by setting the label vector in the unlabeled data D2 "data (no label)" as learning data.

Figure 6:
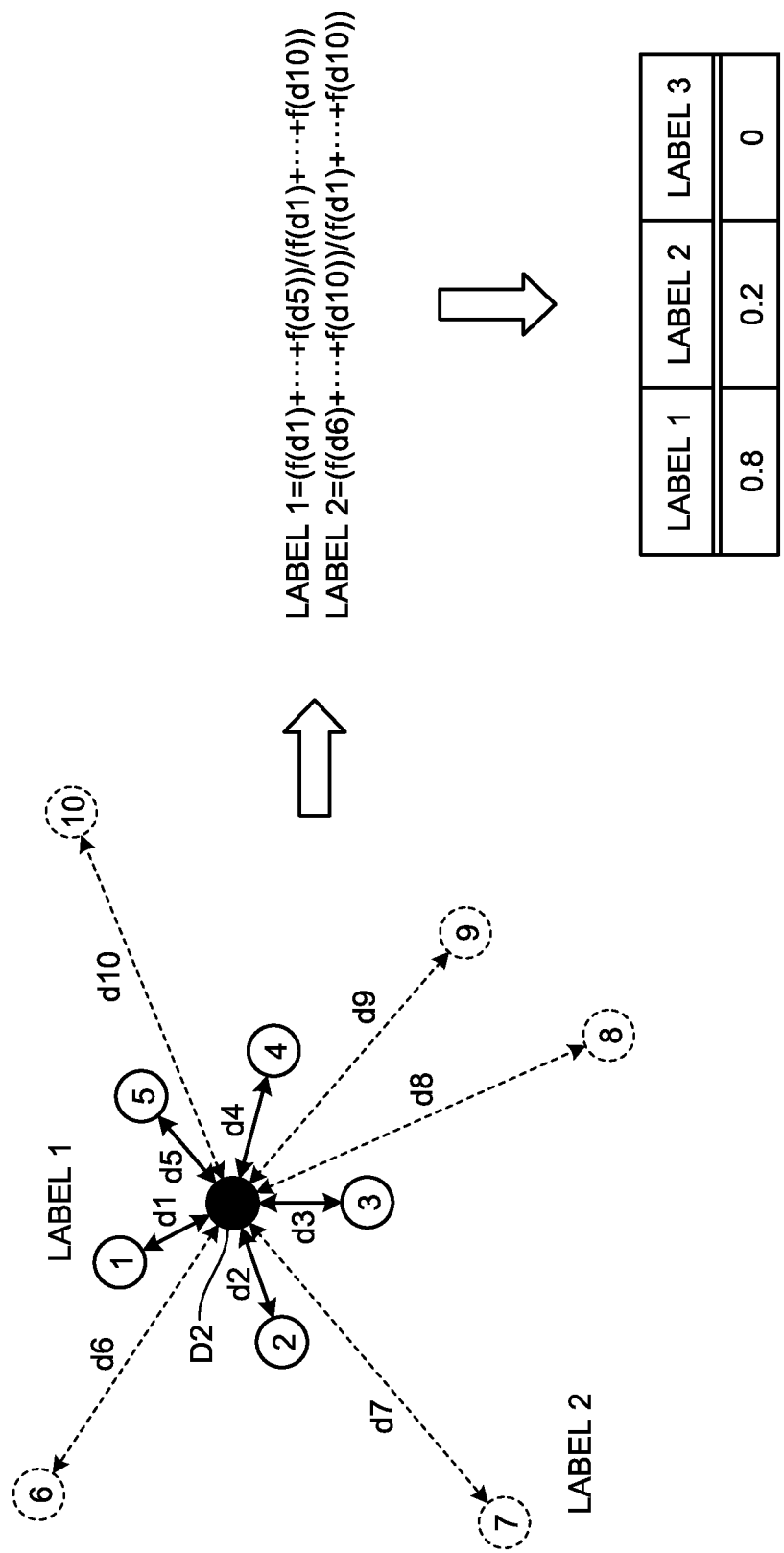
FIG. 6 is a diagram that illustrates an example of the setting of a label vector based on weighting that corresponds to the distance between data sets.

Next, another example of the setting of a label vector is explained. FIG. 6 is a diagram that illustrates an example of the setting of a label vector based on weighting that corresponds to the distance between data sets. As illustrated in FIG. 6, the setting unit 22 extracts labeled data 1, 2, 3, 4, 5 having the label 1 set therefore and labeled data 6, 7, 8, 9, 10 having the label 2 set therefore as labeled data that falls within a range by any predetermined distance from the unlabeled data D2.

Then, the setting unit 22 calculates the distance between unlabeled data and each set of labeled data (data with a label) by using the degree of similarity or the degree of association. Specifically, the setting unit 22 calculates a distance d1 between the unlabeled data D2 and the labeled data 1, a distance d2 between the unlabeled data D2 and the labeled data 2, a distance d3 between the unlabeled data D2 and the labeled data 3, a distance d4 between the unlabeled data D2 and the labeled data 4, and a distance d5 between the unlabeled data D2 and the labeled data 5. In the same manner, the setting unit 22 calculates a distance d6 between the unlabeled data D2 and the labeled data 6, a distance d7 between the unlabeled data D2 and the labeled data 7, a distance d8 between the unlabeled data D2 and the labeled data 8, a distance d9 between the unlabeled data D2 and the labeled data 9, and a distance d10 between the unlabeled data D2 and the labeled data 10.

Then, the setting unit 22 prepares f(x) that is a function (e.g., normal distribution function), in which the value increases as the distance becomes closer, and obtains, as the value of each label, the value obtained by dividing the sum of results of substitution of the distance into f(x) for the respective labels by the sum of all. For example, with regard to the label 1, the setting unit 22 calculates "the label value of the label 1=((f(d1)+f(d2)+f(d3)+f(d4)+f(d5))/(f(d1)+f(d2)+f(d3)+f(d4)+f(d5)+f(d6)+f(d7)+f(d8)+f(d9)+f(d10)))". In the same manner, with regard to the label 2, the setting unit 22 calculates "the label value of the label 2=((f(d6)+f(d7)+f(d8)+f(d9)+f(d10))/(f(d1)+f(d2)+f(d3)+f(d4)+f(d5)+f(d6)+f(d7)+f(d8)+f(d9)+f(d10)))".

Then, the setting unit 22 generates, as a label vector, the label vector "the above-described label value of the label 1, the above-described label value of the label 2, 0". As a result, with regard to the unlabeled data D2, the setting unit 22 stores, in the learning data DB 14, the labeled data D2 "data+label vector" as learning data by setting the label vector in the unlabeled data D2 "data (no label)". For calculation of a weight, various techniques may be used in which an index increases as a distance becomes shorter, and for example the sum of reciprocals of the distances may be also a label value. Furthermore, if labeled data is a relatively small amount and uneven, data having less effect is sometimes included although it is ranked near the top in terms of a close distance; therefore, a problem may arise when a label vector is simply a ratio. In such a case, a technique using a weight is particularly effective.

Furthermore, the degree of similarity is an example of the value obtained by quantifying the similarity between each element included in unlabeled data and each element included in labeled data. For example, as a degree of similarity to determine the similarity between target data sets, it is possible to use the degree of similarity determined by the distance between the target data sets, and cosine similarity between vectors, Euclidean distance between two points, and the like, may be used.

The degree of association is an example of consistency or correlativity between each element included in unlabeled data and each element included in labeled data, and it is for example the degree of correlation or the simultaneous appearance frequency of language data. Furthermore, the degree of similarity and the degree of association may be used differently depending on the type of data; for example, the degree of similarity may be used for document data, and the degree of correlation, or the like, may be used for time-series data. Furthermore, the simultaneous appearance frequency of language data is the ratio of common words among all the words appearing in two sets of data; for example, when the total of 20 words appear except for the words that are overlapped in two sets of data and 5 words are common, the frequency is "5/20". Furthermore, the above-described numerical value, such as 10, or the range by the predetermined distance are only examples, and they may be optionally changed and set.

With reference back to FIG. 3, the learning unit 23 is a processing unit that causes the NN to learn by using learning data stored in the learning data DB 14 and stores a learning result in the learning result DB 15. In the example of FIG. 4, the learning unit 23 executes learning by using the label vector "label 1=0.6, label 2=0.4, label 3=0" as an input with regard to the data with ID=2. Specifically, for execution of semi-supervised learning using labeled data, which has a label originally attached thereto, and unlabeled data, which has no label attached thereto, the learning unit 23 executes learning by using the label vector newly set in each of the labeled data and the unlabeled data.

Flow of a Process

Next, the process to set a label vector as described above is explained. Here, for example, an explanation is given of the sequence of flow in which learning data is generated from input data and then a learning process is executed; however, this is not a limitation, and the process may be also in a different flow.

Figure 7:
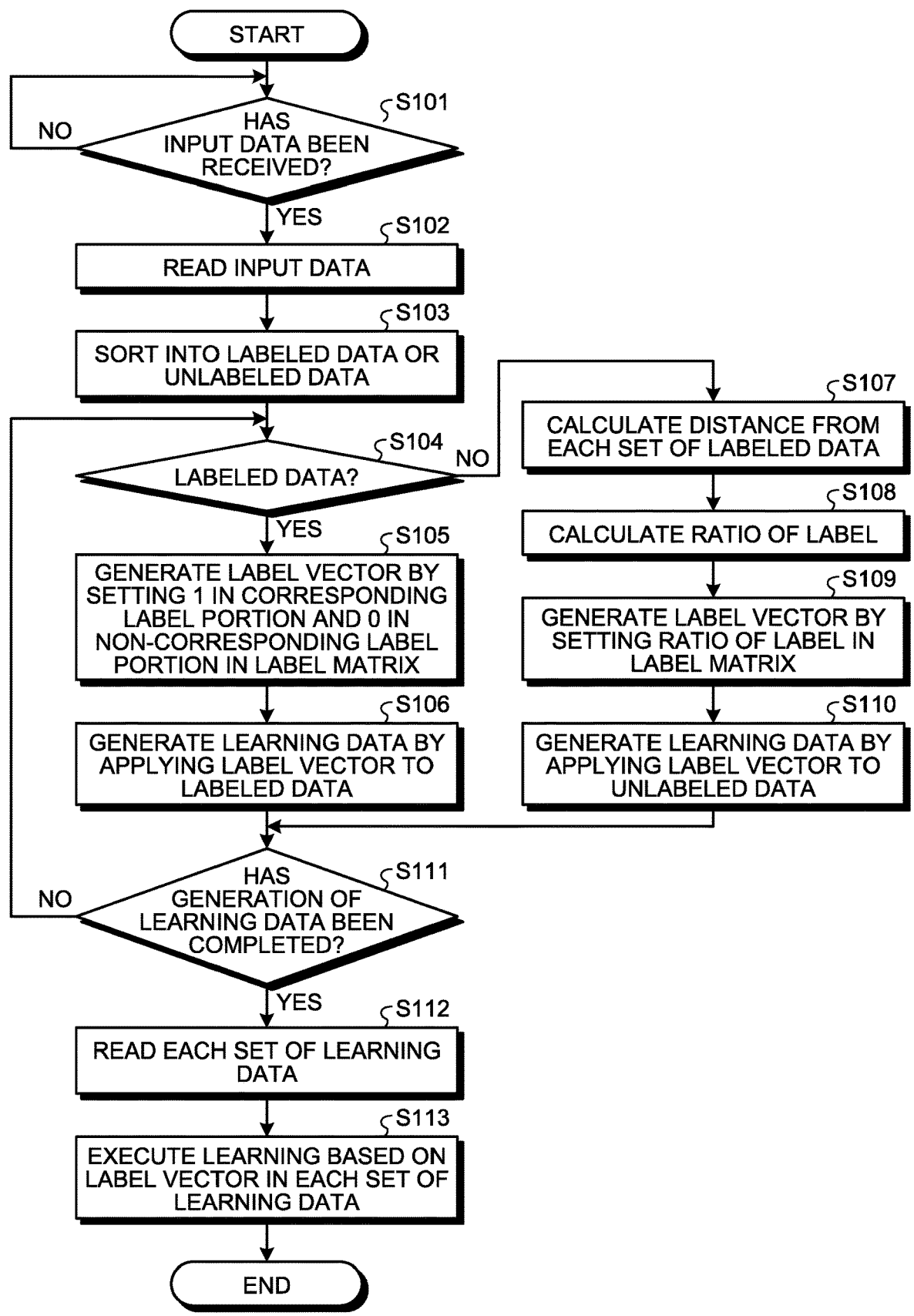
FIG. 7 is a flowchart that illustrates the flow of the process.

FIG. 7 is a flowchart that illustrates the flow of the process. As illustrated in FIG. 7, after input data is received and stored in the input data DB 13 (S101: Yes), the sorting unit 21 reads each set of input data from the input data DB 13 (S102). Then, the sorting unit 21 sorts (classifies) each set of input data into labeled data or unlabeled data (S103).

Then, the setting unit 22 reads the selected input data and determines whether the read input data is labeled data (S104). Then, when the read input data is labeled data (S104: Yes), the setting unit 22 generates a label vector by setting 1 in a corresponding label portion and 0 in a non-corresponding label portion in the label matrix of the labeled data (S105). Then, the setting unit 22 generates learning data by applying the label vector to the labeled data (S106).

Conversely, when the read input data is unlabeled data (S104: No), the setting unit 22 calculates the distance between the unlabeled data and each set of labeled data (S107) and calculates the ratio of each of the labels in neighboring sets of labeled data (S108). Then, the setting unit 22 generates a label vector by setting the ratio of a label in the label matrix (S109). Then, the setting unit 22 generates learning data by applying the label vector to the unlabeled data (S110).

Then, after S106 or S110 is executed, the setting unit 22 determines whether the process from S104 to S110 has been finished and generation of learning data has been completed for all the sets of input data (S111). Here, when there is unprocessed input data and generation of learning data has not been completed (S111: No), the setting unit 22 repeats S104 and subsequent steps.

Conversely, when there is no unprocessed input data and generation of learning data has been completed (S111: Yes), the learning unit 23 reads each set of learning data from the learning data DB 14 (S112) and executes learning based on the label vector in each set of learning data (S113).

Advantages

As described above, the learning apparatus 10 may obtain learning data by applying a label vector, which has the ratio of probability of being each label set thereto, to a large amount of unlabeled data without assuming the separation property of labels or the degree of knowing a distribution. Therefore, even though there is a small amount of labeled data, the learning apparatus 10 allows an increase in the amount of learning data and allows an improvement in the learning efficiency of DL. That is, the learning apparatus 10 may improve the determination accuracy of a learning model for semi-supervised learning using labels that do not have separation property.

Here, an explanation is given of an experimental result by comparing the technique according to the first embodiment and a related technique. First, a condition for the experiment is explained. Here, electroencephalographic data is used as learning data, 20 sets of labeled data, which has a label initially attached thereto, and 600 sets of unlabeled data, which has no label attached thereto, are prepared, and each set of data is difficult to be properly classified by related clustering. Furthermore, the learning apparatus 10 according to the first embodiment uses the DTW (Dynamic Time Warping) distance to extract five sets of labeled data that ranks near the top in terms of a close distance from each set of unlabeled data and sets a label vector by using the ratio of labels of the five extracted sets of labeled data.

Figures 8, 9:
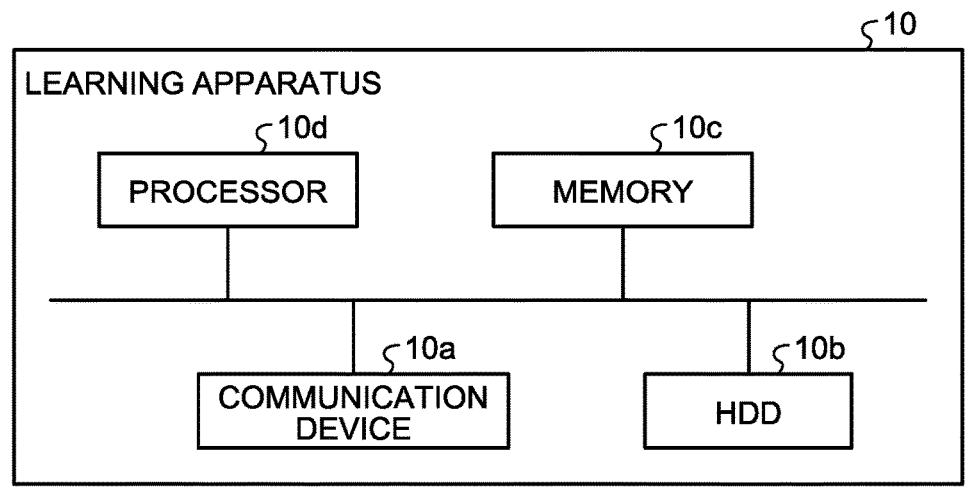
FIG. 8 is a diagram that illustrates an advantage.
FIG. 9 is a diagram that illustrates an example of the hardware configuration.
Figure 10:
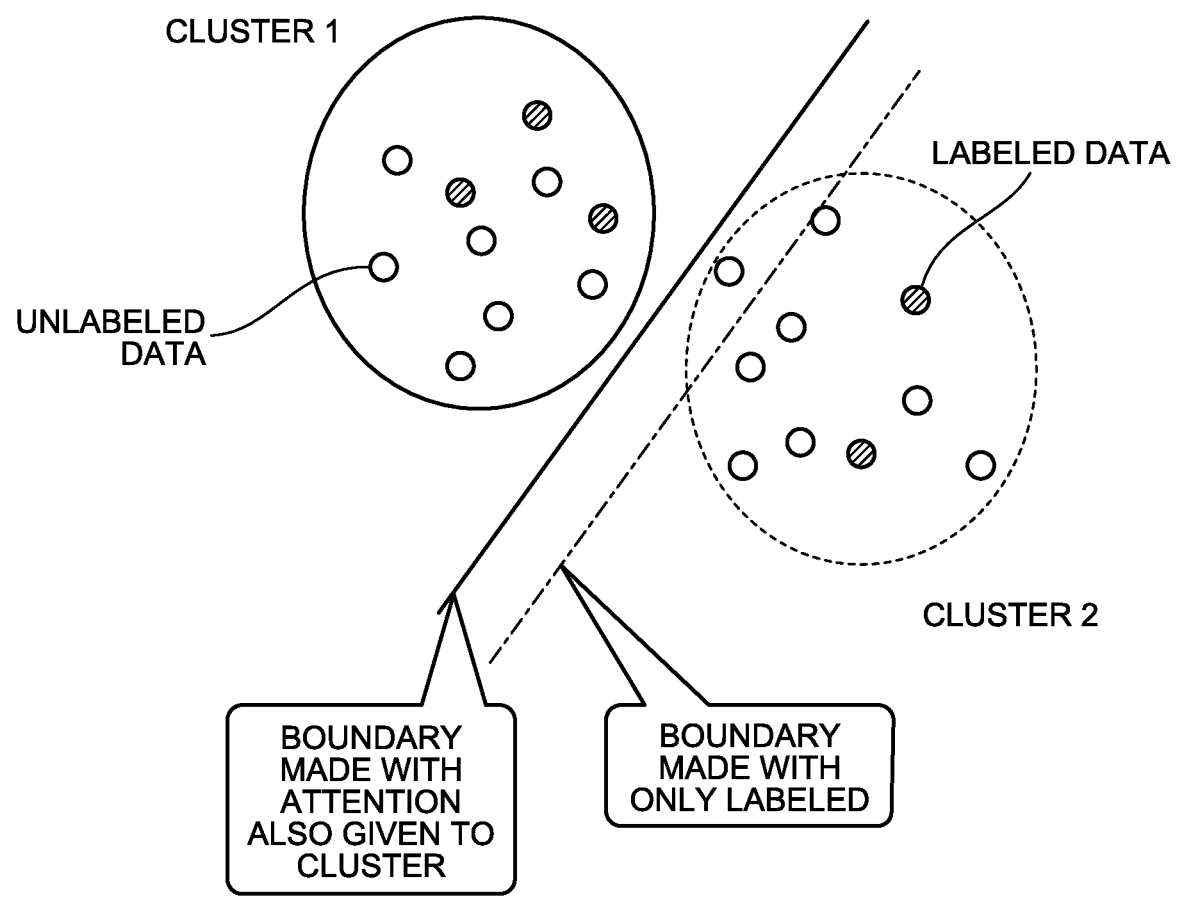
FIG. 10 is a diagram that illustrates clustering according to technique 1.
Figure 11:
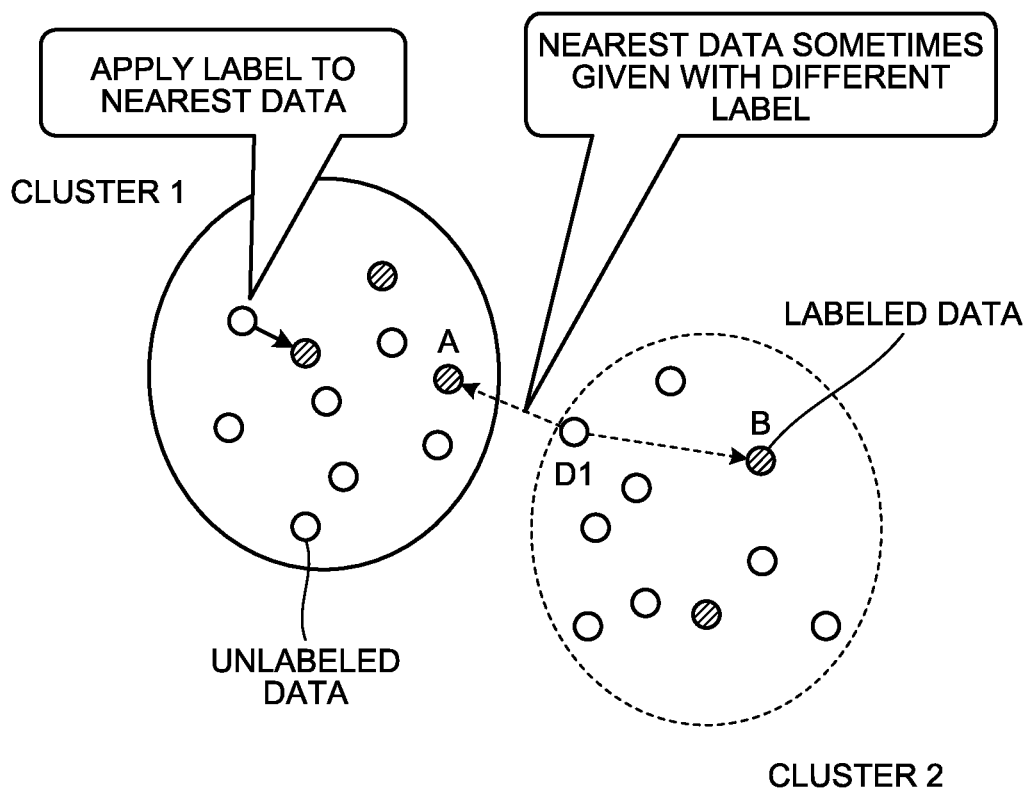
FIG. 11 is a diagram that illustrates label setting according to technique 2.

FIG. 8 is a diagram that illustrates an advantage. As illustrated in FIG. 8, the accuracy is 55% when learning is conducted by using only labeled data (data with a label) which has a label initially attached thereto. Furthermore, the accuracy is 74% when semi-supervised learning is executed by using both labeled data (data with a label), which has a label initially attached thereto, and unlabeled data (pseudo-labeled data), which has a pseudo-label attached thereto by a related technique. Moreover, the accuracy is 78% when learning is executed by using the technique according to the first embodiment that applies a label vector to each of labeled data and unlabeled data so as to also give an accurate label to the unlabeled data.

Thus, the technique according to the first embodiment may prevent a decrease in the determination accuracy of a learning result as compared with other techniques. Furthermore, the technique according to the first embodiment may facilitate learning by applying a label vector in a state where learning is halted, and even though there is a small amount of labeled data, it is possible to improve the circumstance where DL is halted.

[b] Second Embodiment

Although the embodiment according to the present invention is explained above, the present invention may be implemented in various different embodiments other than the above-described embodiment.

Example of Application of a Label Vector

In explanation according to the above-described embodiment, a label vector is also set in labeled data to which a label is originally attached; however, this is not a limitation. For example, typical NN learning is executed on labeled data to which a label is originally attached, and score setting may be executed on unlabeled data, to which no label is originally attached, by using the technique according to the above-described first embodiment.

System

The operation procedures, control procedures, specific names, and information including various types of data and parameters as described in the above specifications and drawings may be optionally changed except as otherwise noted. Furthermore, specific examples, distributions, numerical values, and the like, explained in the embodiment are examples, and they may be optionally changed.

Furthermore, the components of each device illustrated are conceptual in functionality and do not necessarily need to be physically configured as illustrated in the drawings. Specifically, specific forms of separation and combination of each device are not limited to those depicted in the drawings. That is, a configuration may be such that all or some of them are functionally or physically separated or combined in any unit depending on various types of loads, usage, or the like. Furthermore, all or any part of various processing functions executed by each device may be implemented by a CPU and programs analyzed and executed by the CPU or by wired logic hardware.

Hardware

FIG. 9 is a diagram that illustrates an example of the hardware configuration. As illustrated in FIG. 9, the learning apparatus 10 includes a communication device 10a, an HDD (Hard Disk Drive) 10b, a memory 10c, and a processor 10d. Furthermore, each units illustrated in FIG. 9 are connected to one another via a bus, or the like.

The communication device 10a is a network interface card, or the like, and it communicates with other servers. The HDD 10b stores programs and DBs for executing the functions illustrated in FIG. 3.

The processor 10d reads a program for executing the same operation as that of each processing unit illustrated in FIG. 3 from the HDD 10b, or the like, and loads it into the memory 10c, thereby executing the process for performing each of the functions explained in FIG. 3, or the like. Specifically, the process executes the same function as that of each processing unit included in the learning apparatus 10. Specifically, the processor 10d reads a program having the same function as that of the sorting unit 21, the setting unit 22, the learning unit 23, or the like, from the HDD 10b, or the like. Furthermore, the processor 10d executes the process for performing the same operation as that of the sorting unit 21, the setting unit 22, the learning unit 23, or the like.

In this way, the learning apparatus 10 operates as an information processing apparatus that reads and executes a program to implement a learning method. Furthermore, the learning apparatus 10 may read the above-described program from a recording medium by using a medium reading device and execute the above-described read program to implement the same function as that in the above-described embodiment. Furthermore, the program described in other embodiments is not exclusively executed by the learning apparatus 10. For example, the present invention is also applicable to a case there a different computer or server executes the program or a case where they executes the program in cooperation with each other.

The program may be distributed via a network, such as the Internet. Furthermore, the program may be recorded in a recording medium readable by a computer, such as hard disk, flexible disk (FD), CD-ROM, MO (Magneto-Optical disk), or DVD (Digital Versatile Disc), and it may be read and executed from a recording medium by the computer.

According to an embodiment, it is possible to improve the determination accuracy of a learning model during semi-supervised learning using labels having no separation property.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a machine learning program that causes a computer to execute a process comprising:
   selecting a first set of labeled data from a set of labeled data based on a distance between a first piece of unlabeled data and each data of the first set of labeled data, each piece of labeled data in the set of labeled data corresponding to each label of a plurality of labels;
   determining scores of the plurality of labels for the first piece of unlabeled data based on labels corresponding to the first set of labeled data; and
   training a machine learning model including a neural network bar using the set of labeled data, the plurality of labels corresponding to the set of labeled data, the first piece of unlabeled data, and the scores of the plurality of labels.

2. The non-transitory computer-readable recording medium according to claim 1, the process further including:
   generating a label vector using the plurality of labels corresponding to the set of labeled data and the scores of the plurality of labels with regard to the first piece of unlabeled data and the set of labeled data; and
   training the machine learning model by using the generated label vector.

3. The non-transitory computer-readable recording medium according to claim 1, the process further including, for the first piece of unlabeled data, setting, as the scores of the plurality of labels, a ratio of each of labels that are originally attached to the first set of labeled data positioned by a predetermined distance from the first piece of unlabeled data.

4. The non-transitory computer-readable recording medium according to claim 3, the process further including calculating, for the first piece of unlabeled data, the ratio of each of the labels by using a weight whose value increases as a distance becomes shorter with regard to the first set of labeled data positioned by the predetermined distance.

5. The non-transitory computer-readable recording medium according to claim 3, the process further including:
   setting, as the scores of the plurality of label for each of the sets of labeled data, a label vector having 1 set for a corresponding label and having 0 set for other labels;
   setting, as the scores of the plurality of label for the first piece of unlabeled data, a label vector in which the ratio of each of the labels is set; and
   training the machine learning model by using the label vector.

6. The non-transitory computer-readable recording medium according to claim 1, the process further including calculating, as a distance between the first piece of unlabeled data and each data of the first set of labeled data, a degree of similarity based on a distance in a vector space or a distance between data sets specified by elements, obtained by quantifying a similarity between each element included in the first piece of unlabeled data and each element included in each data of the first set of labeled data.

7. The non-transitory computer-readable recording medium according to claim 1, the process further including calculating a degree of association that is consistency or correlativity between each element included in the first piece of unlabeled data and each element included in each data of the first set of labeled data as a distance between the first piece of unlabeled data and each data of the first set of labeled data.

8. The non-transitory computer-readable recording medium according to claim 1, the process further including:
selecting a second set of labeled data from the set of labeled data based on another distance between a second piece of unlabeled data and each data of the second set of labeled data; and
determining other scores of the plurality of labels for the second piece of unlabeled data based on other labels corresponding to the second set of labeled data
wherein the training is executed by using the second piece of unlabeled data and the other scores of the plurality of labels.

9. A machine learning method comprising:
selecting a first set of labeled data from a set of labeled data based on a distance between a first piece of unlabeled data and each data of the first set of labeled data, each piece of labeled data in the set of labeled data corresponding to each label of a plurality of labels;
determining scores of the plurality of labels for the first piece of unlabeled data based on labels corresponding to the first set of labeled data; and
training a machine learning model including a neural network by using the set of labeled data, the plurality of labels corresponding to the set of labeled data, the first piece of unlabeled data, and the scores of the plurality of labels, by a processor.

10. The machine learning method according to claim 9, further including, for the first piece of unlabeled data, setting, as the scores of the plurality of labels, a ratio of each of labels that are originally attached to the first set of labeled data positioned by a predetermined distance from the first piece of unlabeled data.

11. A machine learning apparatus comprising
a processor configured to:
select a first set of labeled data from a set of labeled data based on a distance between a first piece of unlabeled data and each data of the first set of labeled data, each piece of labeled data in the set of labeled data corresponding to each label of a plurality of labels;
determine scores of the plurality of labels for the first piece of unlabeled data based on labels corresponding to the first set of labeled data; and
train a machine learning model including a neural network by using the set of labeled data, the plurality of labels corresponding to the set of labeled data, the first piece of unlabeled data, and the scores of the plurality of labels.

12. The machine learning apparatus according to claim 11, wherein the processor is further configured to, for the first piece of unlabeled data, set, as the scores of the plurality of labels, a ratio of each of labels that are originally attached to the first set of labeled data positioned by a predetermined distance from the first piece of unlabeled data.

* * * * *